July 24, 1923.

F. M. SLATER

ROTARY CYLINDER MOTOR

Filed Jan. 19, 1922

INVENTOR
Fred M. Slater.
BY
Herbert G. Ogden
HIS ATTORNEY

July 24, 1923.

F. M. SLATER 1,462,874

ROTARY CYLINDER MOTOR

Filed Jan. 19, 1922

INVENTOR
Fred M. Slater.
BY
Herbert Ogden
HIS ATTORNEY.

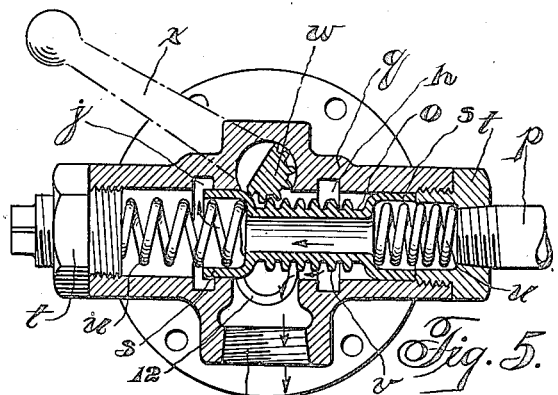
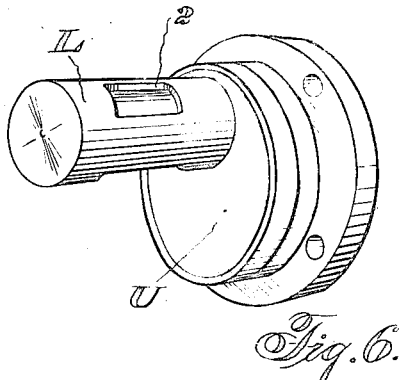
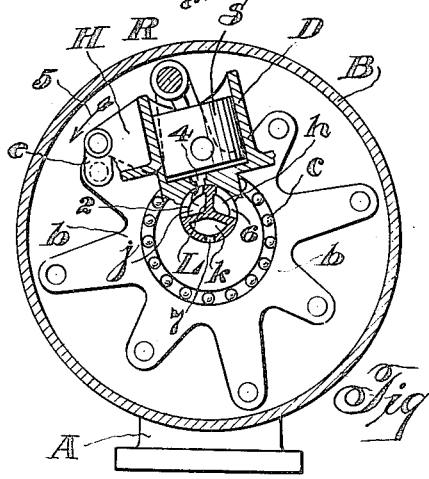
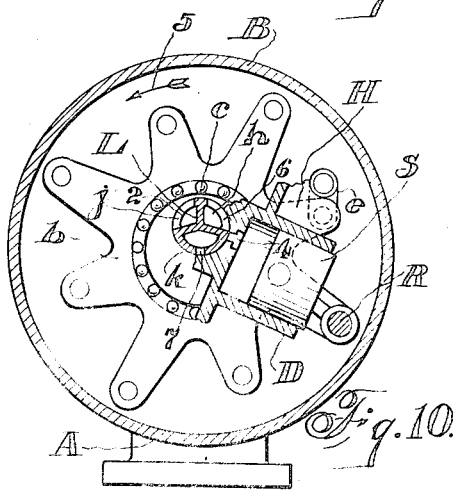
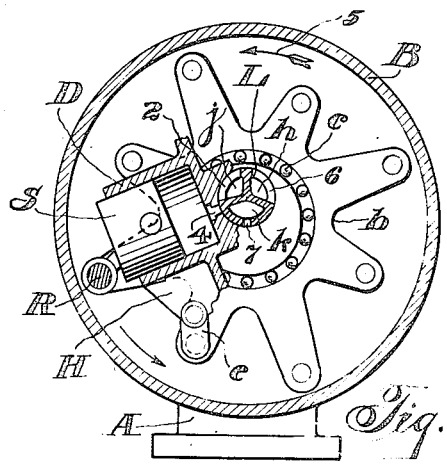
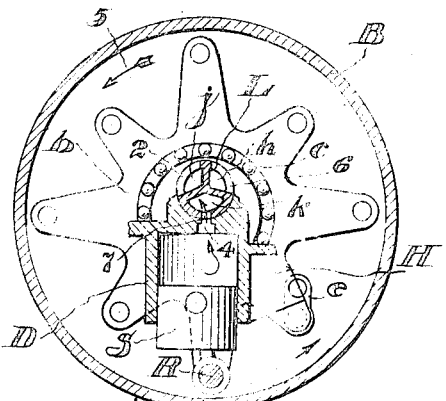

Patented July 24, 1923.

1,462,874

UNITED STATES PATENT OFFICE.

FRED M. SLATER, OF EASTON, PENNSYLVANIA, ASSIGNOR TO INGERSOLL-RAND COMPANY, OF JERSEY CITY, NEW JERSEY, A CORPORATION OF NEW JERSEY.

ROTARY-CYLINDER MOTOR.

Application filed January 19, 1922. Serial No. 530,481.

*To all whom it may concern:*

Be it known that I, FRED M. SLATER, a citizen of the United States, and a resident of Easton, county of Northampton and State of Pennsylvania, have invented a certain Rotary-Cylinder Motor, of which the following is a specification, accompanied by drawings.

This invention relates to rotary fluid actuated cylinder motors, but more particularly to a reversible motor of that type, in which the rotary cylinder member, having one or more cylinders, may act as the driving member operatively connected to rotate a driven member, in the form of a driven shaft. Such rotary motors may be operated by steam, compressed air or other motive fluid, and are useful for numerous industrial purposes, including hauling and hoisting as well understood.

A motor of this type should be strong, compact and preferably capable of developing maximum horse power for minimum size and weight, owing to its many uses which necessarily require that the motor be frequently transported and also subjected to rough handling and even neglect for periods of time.

The objects of this invention are to secure a comparatively light, strong and compact rotary cylinder motor of the reversible type, developing as large horse power as possible for its size and weight. In addition to the new features of mechanical construction and arrangement of parts in my motor which will be apparent from the accompanying specification and drawings, I secure increased power and more economical operation by obtaining properly timed admission and early cut-off of the supply in either direction of rotation of the cylinder member.

Further objects of the invention will hereinafter appear and the motor is shown in one of its preferred forms in the accompanying drawings, in which—

Figure 5 is a detail transverse sectional view of that portion of the motor including the throttle valve on the line 5—5 of Figure 1, looking in the direction of the arrows.

Figure 6 is a detail perspective view of the main bearing, and

Figure 1:
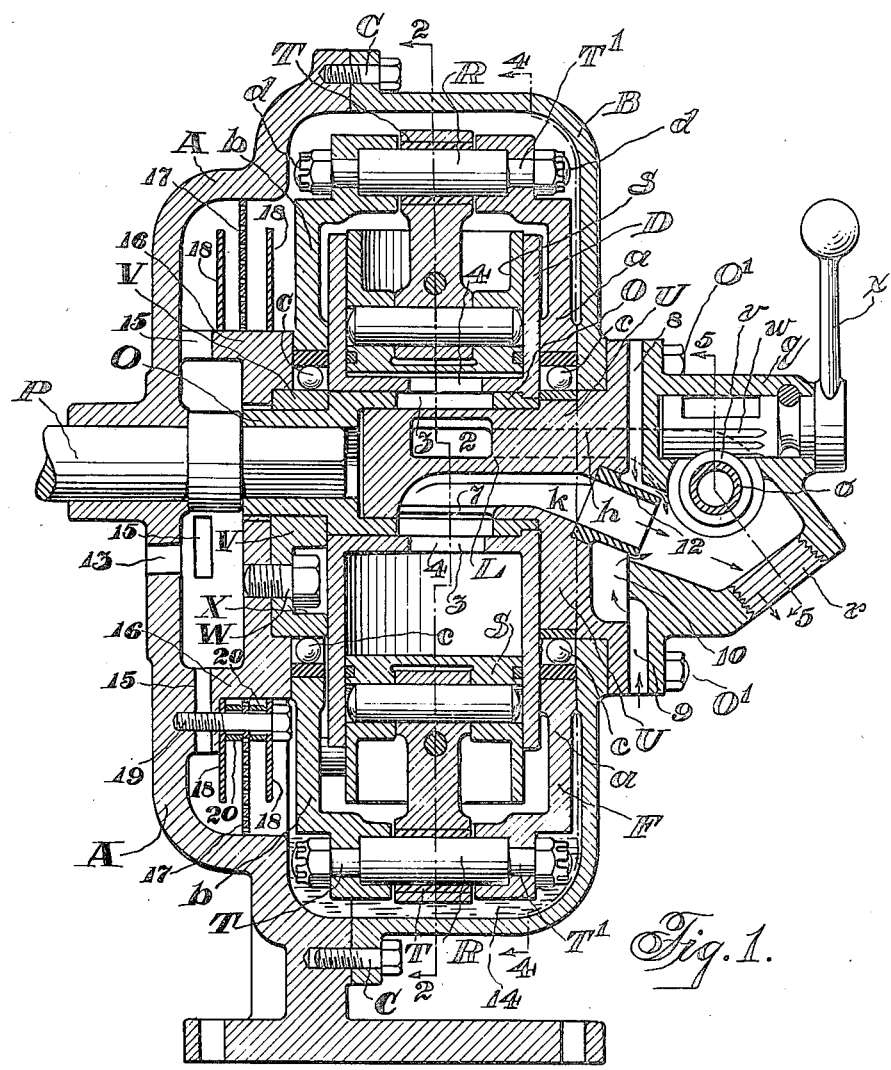
Figure 1 is a longitudinal sectional elevation of a motor embodying the invention, on the line 1—1 of Figure 2 looking in the direction of the arrows.
Figure 2:
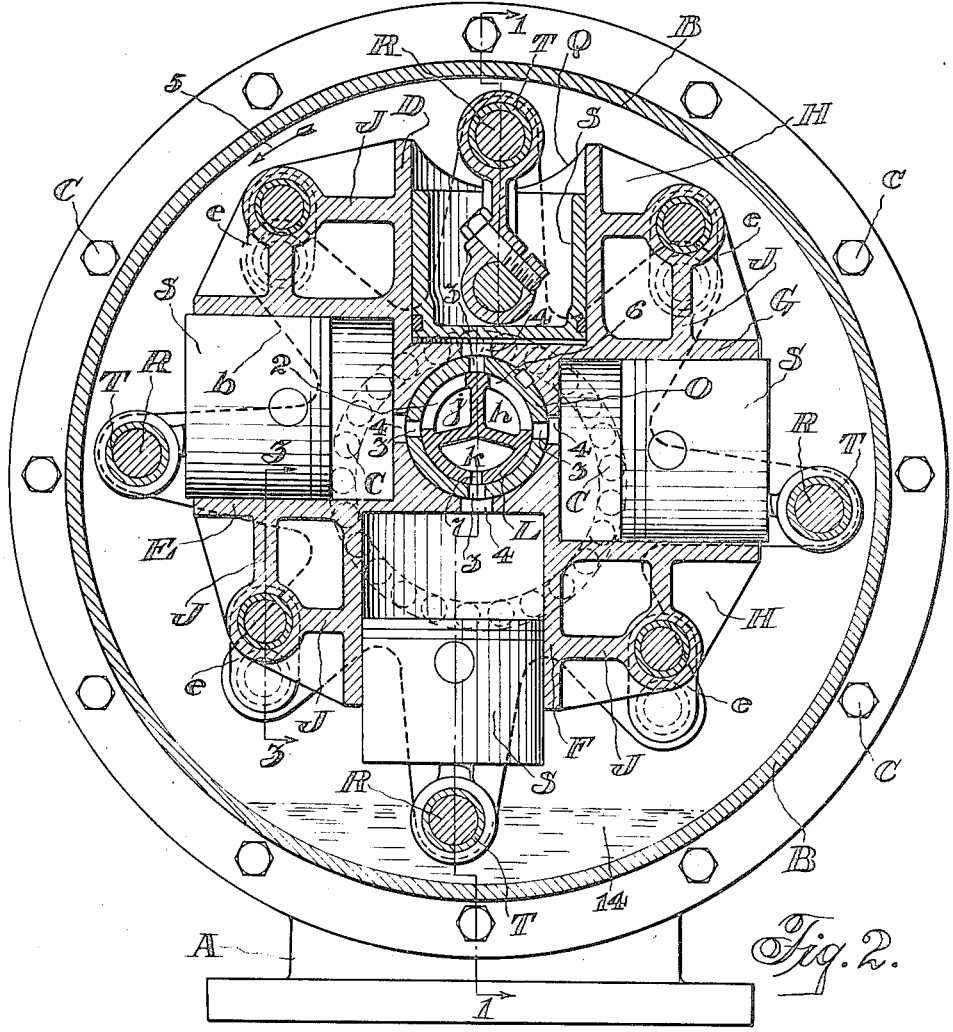
Figure 2 is a transverse sectional elevation on the line 2—2 of Figure 1, looking in the direction of the arrows.

Figures 7, 8, 9 and 10 inclusive, are diagrammatic transverse sectional views illustrating the cycle of operation of the motor, and showing one cylinder only, the other cylinders being omitted for simplicity.

Referring to the drawings, the frame A and case B secured to the frame as by means of the screws C, form the enclosing case for the motor. The cylinder member, which in this instance, forms the driving member of the motor consists of a plurality of rigidly connected angularly disposed cylinders D, E, F and G, four being shown for purposes of illustration, it being understood that as many cylinders may be provided as desired. The cylinders are in this instance constructed as integral parts of a suitable generally circular cylinder casing H, which connects and braces the cylinders, and is preferably provided with stiffening webs J. Such a construction is light and strong and may conveniently be cast or otherwise constructed in one piece.

In this instance, the longitudinal axes of the cylinders are shown lying on chords of a circle, rather than on the radii of the circle so that these axes are preferably off-set from the center of the cylinder member to produce the requisite leverage and reduce the side pressure on the cylinder walls, as will appear, although the cylinders may be radial if desired.

The cylinder member or casing H is mounted to rotate about the stationary shaft L, forming a main bearing suitably supported in the case B, and connected thereto by means of the screws O'. The shaft L extends into the rotary sleeve O keyed to the cylinder casing so as to rotate therewith, and suitably connected to rotate a driven member, as the driven shaft P, extending through the frame A and having a bearing thereon.

The cylinder walls are preferably hollowed at Q to provide clearance for the crank pins R in the pistons S, and these crank pins are preferably provided with bearing sleeves T.

Stationary circular bearings U and V are mounted at each side of the cylinder casing H in any suitable manner and eccentric to the axis of rotation of said member. In this instance, the bearing U is preferably formed as a part of the stationary shaft or main bearing L, the shaft and circular bearing being held from rotation by means of the screws O'. The circular bearing V is conveniently secured to the frame A as by means of the screw W having a head in the recess X in the bearing, and the sleeve O and driven shaft P rotate within the bearing V which also forms a bearing for the sleeve O.

Yoke members, a and b are revolubly mounted on the cylinder bearings U and V and ball-bearings c, consisting of cages and balls, as shown, are preferably interposed between the yokes and the circular bearings U and V. These yokes may be of any desired form or shape and are connected to the projecting ends T' of the crank pins R in any suitable manner, as by means of the castellated nuts d.

Figure 3:
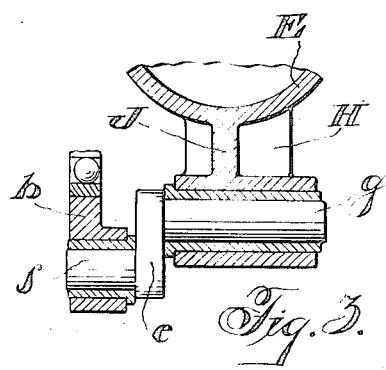
Figure 3 is a detail longitudinal sectional view partly broken away of one of the connecting links of the motor taken on the line 3—3 of Figure 2, looking in the direction of the arrows.
Figure 4:
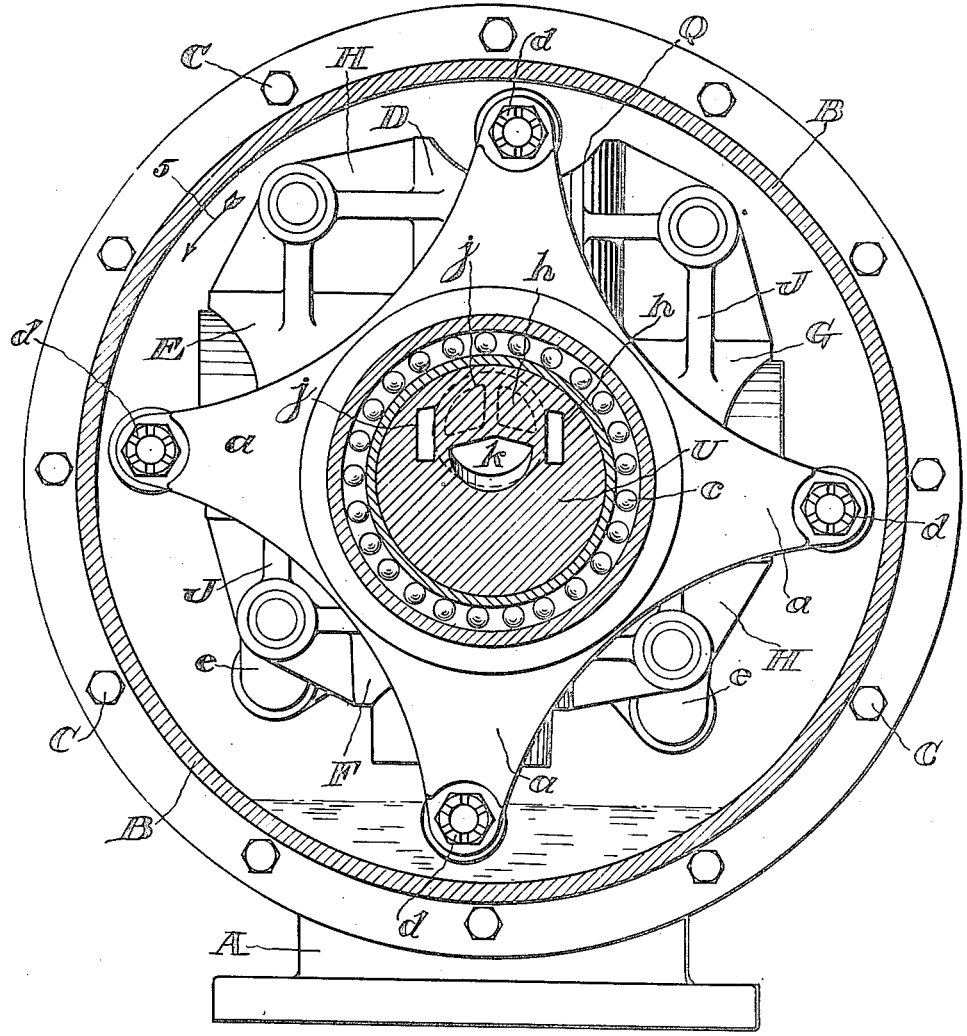
Figure 4 is a transverse sectional view of the motor on the line 4—4 of Figure 1, looking in the direction of the arrows.

Means are preferably provided for maintaining uniform angular rotation of the cylinder members and the yoke members and in this instance, links e having pins f and g are pivoted to the cylinder member H and to the yoke member b as illustrated in detail in Figure 3.

In accordance with this invention, improved means are provided for automatically supplying and distributing motive fluid to the cylinders in such manner as to secure properly timed admission and early cut-off of the supply, regardless of the direction of rotation of the cylinder member. For this purpose, the shaft L, forming the main bearing for the cylinder members, is provided with three motive fluid distribution passages h, j, k, preferably extending from the outer end or portion of the shaft L in position to be controlled by a throttle o and terminating at a point near the inner end of said shaft. Motive fluid is supplied to the motor through the inlet p indicated as a supply pipe in Figure 5, and my improved throttle valve, which forms the subject matter of a separate application, as shown, is hollow and contained within the valve chest q which may be secured against the circular bearing member U and held in position by the same screws O' which hold said member to the case B. Exhaust to atmosphere from the motor takes place through the exhaust port r and in the operation of my motor, the passage k in the main bearing is always in communication with atmosphere through the exhaust port r, while either one of the remaining two passages h and j acts as an inlet when the other of said two passages is open to atmosphere through the throttle valve o and exhaust port r.

The throttle valve o is provided with the heads s, between which and the caps t, are located the springs u, and the central stem of the throttle valve is provided with a rack v with which a segment w having a handle x, engages, for moving the valve longitudinally in the valve chest q.

With the throttle valve o in the position indicated in Figure 5, air entering the inlet p passes through the valve, and through the passage j in the main bearing L for the operation of the motor. Air is supplied through the port 2 leading to the exterior of the main bearing and the ports 3 in the sleeve O, and the ports 4 in the cylinders, to said cylinders successively as the cylinder member rotates, it being assumed that the cylinder member is rotating counter-clockwise in the direction of the arrow 5 for purposes of illustration. The passage h in the main bearing in such case, becomes an exhaust passage, permitting exhaust from the cylinders through the piston ports 4, ports 3 in the sleeve O and port 6 in the periphery of the main bearing, communicating with the passage h, which passage as indicated in Figure 5 is in communication with the atmosphere around the stem portion of the valve o to the exhaust port r. The passage k in the main bearing is at all times an exhaust port for the cylinders through the small port 7 in the periphery of the main bearing, communicating with the passage k.

In the cycle of operations of the motor illustrated diagrammatically in the Figures 7, 8, 9 and 10 with one cylinder only, that is the cylinder D, admission takes place to said cylinder during the period that the port 4 in the cylinder D, travels opposite the port 2 in the bearing, communicating with the inlet passage j as indicated in Figure 7, at the start of the admission. Cut-off then takes place as indicated in Figure 8 and continues until the port 7, leading to the exhaust passage k is uncovered, and after passing the port 7 a slight compression is built up, but owing to the expansion already obtained, increased economy is secured. The cylinder is completely exhausted in passing the port 6 leading to the passage h in the main bearing, which has become an exhaust port, for this direction of rotation, as indicated in Figures 9 and 10. Each cylinder passes through the same cycle and they are successively supplied with motive fluid, cut-off and exhausted, as described for cylinder D.

When the valve o is thrown in the opposite direction to that indicated in Figure 5, the passage h becomes an inlet passage and the passage j becomes an exhaust passage, in which case the cylinder member rotates in the opposite direction with properly timed admission and early cut-off of the supply, as described, and owing to the location of the port 7, the same effects are obtained with rotation in either direction.

Passages 8 and 9 leading to a chamber 10 adjacent the exhaust port r, permit atmospheric air to enter around the exhaust nipple 12, located within the exhaust port and forming a nozzle, which raises the temperature of the nipple above the temperature of the exhaust fluid and thus freezing at the exhaust is prevented. This construction is not herein claimed, but forms the subject matter of a separate application and is only illustrated in this case to show the complete construction of the motor.

Although not claimed herein, I have illustrated means for extracting the lubricating oil for the machine from the air passing from the motor casing to atmosphere through the vent 13 in the frame A. The rotating cylinder member and its operative parts are preferably oiled by splash lubrication from the oil 14 supplied to the motor casing and accumulating in the bottom of the casing, and by the bottom I mean that portion of the casing forming the bottom regardless of the position in which the motor is placed, whether up-side-down or at an angle. Ports 15 are formed in the web 16, forming a part of the frame A to which the circular bearing V is connected, and stationary radial baffle rings are arranged inside the casing and interposed in the path of flow of air ahead of the vent 13. These baffles preferably consist of a perforated plate 17 extending entirely across the opening between the web 16 and the main portion of the frame A. One or more solid plates, in the form of rings 18 and of less width than the ring 17 are located at each side of said perforated ring and these rings are preferably secured to the frame as by means of the screw 19 with separators 20 placed between the baffles. These baffles form a tortuous passage for the air and oil, and the air is permitted to escape to the vent 13, while the oil is extracted from the air and deposited on the baffles, so that it may flow back around the web 16 to the bottom of the casing, regardless of the position in which the motor is placed.

I claim:

1. In a reversible rotary fluid actuated cylinder motor, a main bearing for the cylinder member having three motive fluid distribution passages, one of said passages always being in communication with the atmosphere, and reversing means for causing either one of the remaining two passages to act as an inlet when the other of said two passages is caused to be open to atmosphere, a rotary cylinder member having at least one cylinder mounted to rotate on said bearing, and a port adapted to successively connect the cylinder with the said three passages as the cylinder rotates, whereby properly timed admission to the cylinder through that passage acting as an inlet and early cut-off of the supply and then exhaust from the cylinder is obtained in either direction of rotation of the cylinder member as controlled by the said reversing means.

2. In a reversible rotary fluid actuated cylinder motor, a stationary main bearing for the cylinder member, having three longitudinal passages, reversing means controlling two of said passages, ports connecting said passages with the exterior of the bearing, one of said passages always being in communication with the atmosphere, a cylinder member having at least one cylinder mounted to rotate on said bearing, and a port in said cylinder member adapted to successively connect the cylinder with the ports in said bearing as the cylinder rotates, whereby admission to the cylinder and early cut-off of the supply and then exhaust from the cylinder is obtained in either direction of rotation as controlled by said reversing means.

3. In a reversible rotary fluid actuated cylinder motor, a stationary main bearing for the cylinder member, having three longitudinal passages, one of said passages always being in communication with the atmosphere, and reversing means for causing either one of the remaining two passages to act as an inlet when the other of said two passages is caused to be open to atmosphere, ports connecting said passages with the exterior of the bearing, a cylinder member having at least one cylinder mounted to rotate on said bearing, and a port in said member adapted to successively connect the cylinder with the ports in said bearing, as the cylinder rotates, whereby properly timed admission to the cylinder through that passage acting as an inlet and early cut-off of the supply and then exhaust from the cylinders is obtained in either direction of rotation, as controlled by said reversing means.

4. In a reversible rotary fluid actuated cylinder motor, a stationary main bearing for the cylinder member having three longitudinal passages extending from the outer end to a point near the inner end, one of said passages always being in communication with the atmosphere, and either one of the remaining two passages acting as an inlet when the other of said two passages is open to the atmosphere, ports connecting the inner ends of said passages with the exterior of the bearing, a cylinder member having at least one cylinder mounted to rotate on said bearing, and a port in said member adapted to successively connect the cylinder with the ports in said bearing.

5. A reversible rotary fluid actuated cylinder motor, comprising a stationary main bearing having three longitudinal passages extending from the outer end to a point near the inner end, one of said passages always being in communication with the atmosphere, and either one of the remaining two passages acting as an inlet when the other of said two passages is open to the atmosphere, ports connecting the inner ends of said passages with the exterior of the bearing, a cylinder member having at least one cylinder mounted to rotate on said bearing, a port in said member adapted to successively connect the cylinder with the ports in said bearing, a piston in said cylinder, a yoke member pivoted eccentrically at one side of the cylinder member, and operatively connected to the piston, means for maintaining uniform angular rotation of the cylinder member and yoke member, and a driven member connected to be rotated by one of said cylinder or yoke members.

In testimony whereof I have signed this specification.

FRED M. SLATER.